United States Patent
Turina et al.

(10) Patent No.: US 12,108,245 B2
(45) Date of Patent: Oct. 1, 2024

(54) METHOD AND APPARATUS FOR PERFORMING PROTECTION CONTROL IN A CORE NETWORK

(71) Applicant: Telefonaktiebolaget LM Ericsson (publ), Stockholm (SE)

(72) Inventors: Klaus Turina, Herzogenrath (DE); Abhay Ds, Beijing (CN); Ziquan Pan, Beijing (CN); Daniel Nilsson, Älvängen (SE); Wei Luo, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 323 days.

(21) Appl. No.: 17/636,772

(22) PCT Filed: Aug. 6, 2020

(86) PCT No.: PCT/CN2020/107334
§ 371 (c)(1),
(2) Date: Feb. 18, 2022

(87) PCT Pub. No.: WO2021/031864
PCT Pub. Date: Feb. 25, 2021

(65) Prior Publication Data
US 2022/0295270 A1    Sep. 15, 2022

(51) Int. Cl.
*H04W 12/033*    (2021.01)
*H04W 12/088*    (2021.01)

(52) U.S. Cl.
CPC ....... *H04W 12/033* (2021.01); *H04W 12/088* (2021.01)

(58) Field of Classification Search
CPC ........................... H04W 12/033; H04W 12/088
See application file for complete search history.

(56) References Cited

U.S. PATENT DOCUMENTS

| 11,765,608 B2 * | 9/2023 | Yao ........... H04W 24/08 370/252 |
| 2019/0068625 A1 | 2/2019 | Alfano et al. |
| 2019/0253885 A1 | 8/2019 | Bykampadi et al. |

FOREIGN PATENT DOCUMENTS

| CN | 104335553 A | 2/2015 |
| CN | 109617865 A | 4/2019 |

(Continued)

OTHER PUBLICATIONS

Deutsche Telekom AG et al., "TS 23.501: Introduction of Security Edge Protection Proxy", S2-178990 (was S2-178930), SA WG2 Meeting #124, Nov. 27-Dec. 1, 2017, Reno, USA (20 pages).

(Continued)

*Primary Examiner* — Natasha W Cosme
(74) *Attorney, Agent, or Firm* — Rothwell, Figg, Ernst & Manbeck, P.C.

(57) ABSTRACT

The present application generally relates to wireless communication technology. More particularly, the present application relates to a method and apparatus for performing protection control in a core network with separation between control plane and user plane. The present application also relates to computer program product adapted for the same purpose. According to one embodiment, a method for performing protection control in a core network with separation between control plane and user plane, comprises the following steps performed on the user plane: —a) pairing a User Plane Function (UPF) and at least one User Plane Security Function (UPSF); and —b) notifying a pairing relationship between the UPF and the UPSF to the control plane so that the pair of the UPF and the UPSF can be controlled by a Control Plane Function (CPF) via the same reference point.

24 Claims, 7 Drawing Sheets

(56) References Cited

FOREIGN PATENT DOCUMENTS

| | | |
|---|---|---|
| CN | 110048873 A | 7/2019 |
| KR | 1020190011302 A | 2/2019 |
| KR | 10-2019-0050835 A | 5/2019 |
| WO | 2018/167307 A1 | 9/2018 |
| WO | 2018/208371 A1 | 11/2018 |
| WO | 2019/078888 A1 | 4/2019 |

OTHER PUBLICATIONS

Nokia et al., "Solution to KI #27—UP Gateway function for protection of inter-PLMN N9 interface", S3-191525 (revision of S3-19xabc), 3GPP TSG SA WG3 (Security) Meeting #95, Reno, NV, USA, May 6-10, 2019, XP051721688 (3 pages).

Ericsson, "Deployment options for the UP gateways", S3-193082 (revision of S3-192818), 3GPP TSG-SA WG3 Meeting #96, Wroclaw (Poland), Aug. 26-30, 2019, XP051760477 (6 pages).

International Search Report and Written Opinion dated Nov. 11, 2020 in International Application No. PCT/CN2020/107334 (6 pages total).

3GPP TS 33.501 V1.0.0, Mar. 31, 2018, 3rd Generation Partnership Project; Technical Specification Group Services and System Aspects; Security architecture and procedures for 5G system (Release 15) (128 pages total).

3GPP TS 29.500 V16.1.0, Sep. 2019, 3rd Generation Partnership Project; Technical Specification Group Core Network and Terminals; 5G System; Technical Realization of Service Based Architecture; Stage 3 (Release 16) (43 pages total).

3GPP TS 33.501 V16.0.0, Sep. 2019, 3rd Generation Partnership Project; Technical Specification Group Services and System Aspects; Security architecture and procedures for 5G system (Release 16) (196 pages total).

3GPP TS 29.244 V16.1.0, Sep. 2019, 3rd Generation Partnership Project; Technical Specification Group Core Network and Terminals; Interface between the Control Plane and the User Plane Nodes; Stage 3 (Release 16) (243 pages total).

3GPP TS 23.502 V16.2.0, Sep. 2019, 3rd Generation Partnership Project; Technical Specification Group Services and System Aspects; Procedures for the 5G System (5GS); Stage 2 (Release 16) (525 pages total).

3GPP TS 23.503 V16.2.0, Sep. 2019, 3rd Generation Partnership Project; Technical Specification Group Services and System Aspects; Policy and Charging Control Framework for the 5G System (5GS); Stage 2 (Release 16) (104 pages total).

3GPP TS 29.573 V16.0.0, Sep. 2019, 3rd Generation Partnership Project; Technical Specification Group Core Network and Terminals; 5G System; Public Land Mobile Network (PLMN) Interconnection; Stage 3 (Release 16) (79 pages total).

* cited by examiner

METHOD AND APPARATUS FOR PERFORMING PROTECTION CONTROL IN A CORE NETWORK

CROSS REFERENCE TO RELATED APPLICATIONS

This application is a 35 U.S.C. § 371 National Stage of International Patent Application No. PCT/CN2020/107334, filed Aug. 6, 2020, which claims priority to International Patent Application No. PCT/CN2019/101387, filed Aug. 19, 2019. The above-identified applications are incorporated by this reference.

TECHNICAL FIELD

The present application generally relates to wireless communication technology. More particularly, the present application relates to a method and an apparatus for performing protection control in a core network with separation between control plane and user plane. The present application also relates to computer program product adapted for the same purpose.

BACKGROUND

Interfaces internal to the 5G Core such as N4 and N9 and roaming interfaces between PLMNs such as N9, can be used to transport signaling data as well as privacy sensitive material, such as user and subscription data, or other parameters, such as security keys. Therefore, confidentiality and integrity protection are required.

Currently, the security architecture, i.e., the security features and the security mechanisms for the 5G System and the 5G Core, and the security procedures performed within the 5G System including the 5G Core and the 5G New Radio are specified. See 3GPP TS 33.501, which is incorporated herein by reference in its entirety.

However, the current security architecture is limited to control plane and does not specify User Plane security functions on N9 roaming interface for home routed scenario.

SUMMARY

One of the objects is to provide methods and apparatus for performing protection control in a core network with separation between control plane and user plane, which could reduce resources used for protection control.

According to one embodiment, a method for performing protection control in a core network with separation between control plane and user plane comprises the following steps performed on the user plane:
a) pairing a User Plane Function (UPF) and at least one User Plane Security Function (UPSF); and
b) notifying a pairing relationship between the UPF and the UPSF to the control plane so that the pair of the UPF and the UPSF can be controlled by a Control Plane Function (CPF) via the same reference point.

According to another embodiment, a method for performing protection control in a core network with separation between control plane and user plane comprises the following steps performed on the control plane:
a) selecting at least one User Plane Security Function (UPSF) for a User Plane Function (UPF) on the basis of a pairing relationship; and
b) controlling the UPF and the UPSF by a Control Plane Function (CPF) via the same reference point.

According to another embodiment, an apparatus for performing protection control in a core network with separation between control plane and user plane comprises:
a storage device configured to store a computer program comprising computer instructions; and
a processor coupled to the storage device and configured to execute the computer instructions to perform the method as described above.

According to another embodiment, a core network with separation between control plane and user plane comprises:
a User Plane Function (UPF);
one or more User Plane Security Functions (UPSFs); and
a Control Plane Function (CPF),
wherein the UPF and at least one of the UPSFs are paired and controlled by the CPF via the same reference point.

According to another embodiment, a computer program product for performing protection control in a core network with separation between control plane and user plane, the computer program product being embodied in a computer readable storage medium and comprising computer instructions for perform the method as described above.

Preferably, the at least one of the UPSFs is a User Plane Firewall (UPFw) or a user plane component of a Security Edge Protection Proxy (SEPP-UP), and the CPF is a Session Management Function (SMF) or a Service Communication Proxy (SCP).

Preferably, the core network further comprises a Packet Core Gateway (PCG), and the at least one of the UPSF and the UPF are paired by including them into the PCG or binding them to the PCG.

Preferably, the at least one of the UPSF and the UPF are paired by integrating the UPSF into the UPF.

Preferably, the at least one of the UPSF and the UPF are configured to notify their pairing relationship to a Network Repository Function (NRF) during a service registration procedure or a service update procedure.

Preferably, the at least one of the UPSF and the UPF are configured to notify the pairing relationship by transmitting to the NRF a UPF profile from the UPF and a UPSF profile from the UPSF, the UPF profile from the UPF and the UPSF profile from the UPSF include IDs for the UPF and the UPSF.

Preferably, the SMF is configured to obtain the pairing relationship during a discovery procedure.

Preferably, the SMF is configured to selects a UPSF for the UPF on the basis of the pairing relationship during a Protocol Data Unit (PDU) session establishment procedure.

The solution of the present disclosure has the following advantages:
- It minimizes the amount of additional signaling messages for supporting new functionality. Particularly, it not only reduces processing resources on CP and UP and complexity of network topology but also simplifies traffic flows and reduces energy consumption in products.
- The number of UP nodes in a path for each traffic flow are minimum and thus the resources required by the network are reduced. Moreover, this is achieved without limitation on the deployment, especially without limitation on the evolvement of existing GTP-FW products.
- The workload for amending the existing part of 3GPP Technical Specifications, e.g., SA2, SA3, CT, is minimized as the changes are only represented in form of small additions to existing specifications for defining new Network Function types and reference points.

BRIEF DESCRIPTION OF THE DRAWINGS

The foregoing and other objects, features, and advantages would be apparent from the following more particular description of preferred embodiments as illustrated in the accompanying drawings in which.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
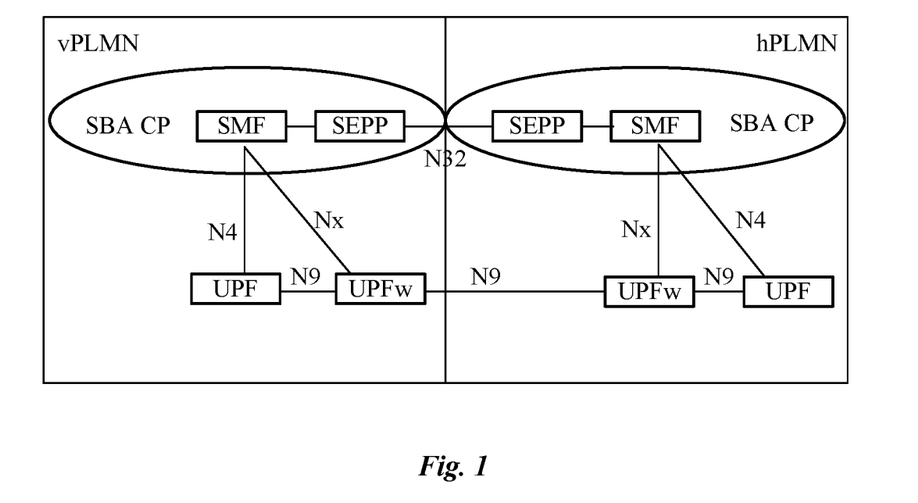
FIG. 1 schematically illustrates a 5G System Architecture in reference point representation.

FIG. 1 schematically illustrates a 5G System Architecture in reference point representation.

As shown in FIG. 1, in each of home Public Land Mobile Network (hPLMN) and visited Public Land Mobile Network (vPLMN), a User Plane Security Function (UPSF), e.g., a user plane component of a Security Edge Protection Proxy (SEPP-UP), a User Plane Firewall (UPFw) or a N9-FW is deployed for integrity and roaming protection. Throughout the present disclosure, SEPP-UP, UPFw and N9-FW are interchangeable. In the hPLMN (or vPLMN), the SEPP-Up requires instructions from Control Plane (CP) to fulfil their functionality. The interworking between a Control Plane Function (CPF), e.g., SMF and the SEPP-UP is described in a reference point Nx. The implementation of the Nx interface is done by implementing a Control protocol terminated on CP and UP. On the other hand, The interworking between the SMF and a User Plane Function (UPF) is described in a reference point N4.

In the architecture as shown in FIG. 1, processing for protocols and information transmission requires resources in CP and UP, and even if the SEPP-UP and the UPF are collocated or combined in the hPLMN (or vPLMN), it still needs two protocol endpoints in CP and UP—one for controlling UPF and another for controlling SEPP-UP. Consequently, number of messages between CP and UP is doubled and time periods for establishing a communication path increase.

Figure 2:
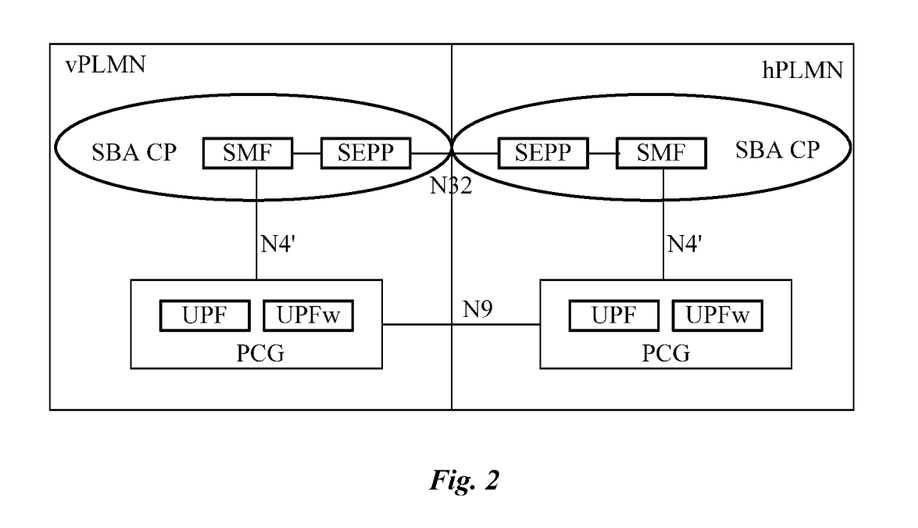
FIG. 2 schematically illustrates an improved 5G System Architecture in reference point representation according to one of the embodiments of the present invention.

FIG. 2 schematically illustrates an improved 5G System Architecture in reference point representation according to one of the embodiments of the present invention.

As shown in FIG. 2, in each of home Public Land Mobile Network (hPLMN) and visited Public Land Mobile Network (vPLMN), the UPFw and UPF are paired by being included in, or closely bound to, a Packet Core Gateway (PCG). In particular, the paired UPF and UPFw can be controlled by the SMF or SCP (not shown) via the same reference point, e.g., N4. As a result, it is possible to optimize the selection and control of the User Plane processing function as well as minimize the control overhead.

Alternatively, the UPFw and the UPF are paired by integrating the UPFw into the UPF. That is, the UPF is equipped with capability to perform function of the UPFw.

In order to have knowledge that the UPFw and the UPF are paired, UP notifies a pairing relationship between the UPFw and the UPF to UP, e.g., the SMF. The SMF will select a UPFw as indicated in the pairing relationship as a preferred one for the UPF.

Preferably, the pairing relationship is included in a NfProfile transmitted to a Network Repository Function (NRF) during UPF service registration procedure or UPF service update procedure. In an illustrative example, this can be achieved by modifying a NfProfile as defined in 3GPP TS 29.510, which is incorporated herein by reference in its entirety. In particular, 3GPP TS 29.510 v15.3.0 and v16.0.0 defines a structure of the NfProfile which allows the setting of NF-Type specific information in 'info' fields. For NFType 'UPF', Data Type 'UpfInfo' is defined as follows:

In case a UPF instance has more than one optimal UPFw instances, e.g., due to multiple co-deployed UPFw instances, a list of NfInstanceIDs can be provided for Attribute 'preferredUpfwInstId'.

During UPF selection procedure, the SMF (or SCP in case of delegated discovery) can select a UPF depending on its capabilities by doing standard NF Discovery procedure and filtering the received NfProfiles to select a UPFw as indicated in the NfProfiles for the UPF.

In case where the SMF (or SCP in case of delegated discovery) identifies a need for roaming, e.g., between the hPLMN) and vPLMN as shown in FIG. 2, it can obtain from a NfProfile a preferred UPFw for the UPF and then put this preference when selecting this instance. Therefore, it is possible to send information from CP to UP only once via the reference point N4. This is particular advantageous when information sent from CP to UPF and UPFw are almost identical and thus modification to N4 are minimal.

| Attribute name | Data type | P | Cardinality | Description |
| --- | --- | --- | --- | --- |
| sNssaiUpfInfoList | array(SnssaiUpfInfoItem) | M | 1 . . . N | List of parameters supported by the UPF per S-NSSAI |
| smfServingArea | array(string) | O | 1 . . . N | The SMF service area(s) the UPF can serve. If not provided, the UPF can serve any SMF service area. |
| interfaceUpfInfoList | array(InterfaceUpfInfoItem) | O | 1 . . . N | List of User Plane interfaces configured on the UPF. When this IE is provided in the NF Discovery response, the NF Service Consumer (e.g. SMF) may use this information for UPF selection. |
| iwkEpsInd | boolean | O | 0 . . . 1 | Indicates whether interworking with EPS is supported by the UPF. true: Supported false (default): Not Supported |
| pduSessionTypes | array(PduSessionType) | O | 1 . . . N | List of PDU session type(s) supported by the UPF. The absence of this attribute indicates that the UPF can be selected for any PDU session type. |

For illustrative purpose, the following attribute can be added in this field with a unique reference to the UPFw instance. This can be e.g. by adding a field 'preferred UP-FW instance' with the UUID of the collocated UPFw:

As described above, the UPFw and the UPF can be paired by integrating the UPFw into the UPF. In such case, the NfProfile for UPF may include an indicator to describe whether UPF instance has the capabilities to execute UPFw

| Attribute name | Data type | P | Cardinality | Description |
| --- | --- | --- | --- | --- |
| preferredUpfwInstId | NfInstanceId | O | 0 . . . 1 | Preferred UPFw instance of this UPF instance. | function or not. In an illustrative example, this can be achieved by modifying a NfProfile as defined in 3GPP TS 29.510, which is incorporated herein by reference in its entirety. In particular, 3GPP TS 29.510 v15.3.0 and v16.0.0 defines a structure of the NfProfile which allows the setting of NF-Type specific information in 'info' fields. For illustrative purpose, the following attribute can be added in this field:

| Attribute name | Data type | P | Cardinality | Description |
|---|---|---|---|---|
| upfCapabilities | array(upfCapability) | O | 0 . . . 1 | List of Capabilities supported by the UPF. If not present the UPF supports only UPF capabilities. |

Note that due to the attribute being an array type, it is possible to list multiple capabilities within the same NfProfile.

The field can then list the functional capabilities of a specific UPF instance defined in the NfProfile. For example, the enumeration value can be defined as follows:

| Enumeration value | Description |
|---|---|
| "UPF" | NF supports UPF functionality |
| "N9-FW" | NF supports N9-FW functionality |

Figure 3:
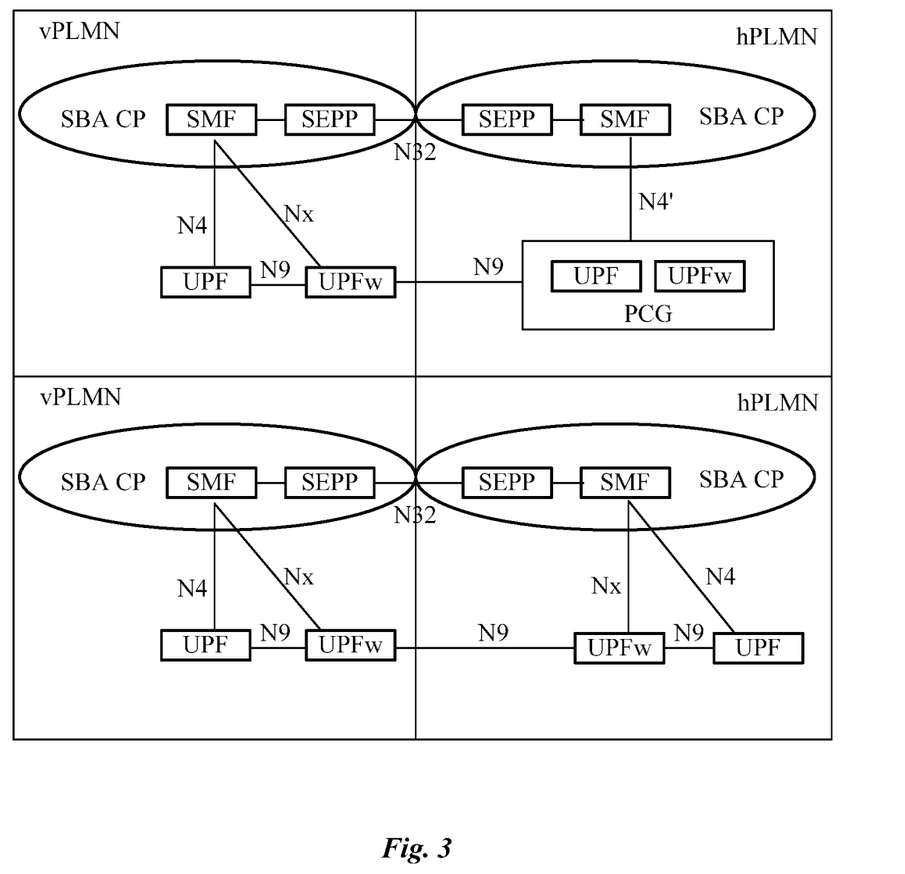
FIG. 3, which schematically illustrates some examples of the deployment between hPLMN and vPLMN FIG. 4 schematically illustrates a flowchart of the method performing protection control in a core network according to another embodiment of the present invention.

It shall be noted that the operation of the above improved Architecture as shown in FIG. 2 has no dependency on the deployment between hPLMN and vPLMN. FIG. 3 schematically illustrates some examples of the deployment between hPLMN and vPLMN. As shown in FIG. 3, in case the SMF needs to select a UPFw and the preferred instance from UPF is not available, it can select any other UPFw instance. In such case, two different control sessions need to be established and user plane connection might not be optimized.

Figure 4:
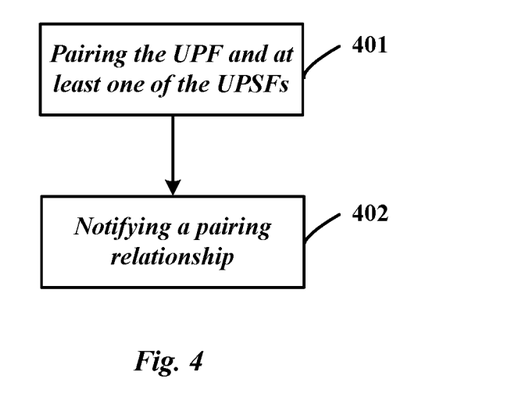

A flowchart of a method 400 for performing protection control in a core network according to another embodiment of the present invention is shown in FIG. 4. The core network, with separation between control plane and user plane, comprises a UPF, one or more UPSFs and a CPF.

As shown in FIG. 4, the flowchart comprises the following steps performed at UP side:
  Step 401: pairing the UPF and at least one of the UPSFs; and
  Step 402: notifying a pairing relationship between the UPF and the at least one of the UPSFs to the control plane, e.g., the CPF, so that the pair of the UPF and the UPSF can be controlled by the CPF via the same reference point, e.g., N4.

In this embodiment, preferably, the at least one of the UPSFs and the UPF are paired by including them into a Packet Core Gateway (PCG) or binding them to the PCG, or the at least one of the UPSFs and the UPF are paired by integrating the UPSF into the UPF.

In this embodiment, preferably, the notifying is performed during a service registration procedure or a service update procedure associated with a Network Repository Function (NRF).

In this embodiment, preferably, the notifying is performed by separately transmitting profiles of the UPF and the UPSF to the NRF. In other words, the UPF and the UPSF transmit their respective profiles, e.g. NfProfiles, to the NRF.

Figure 5:
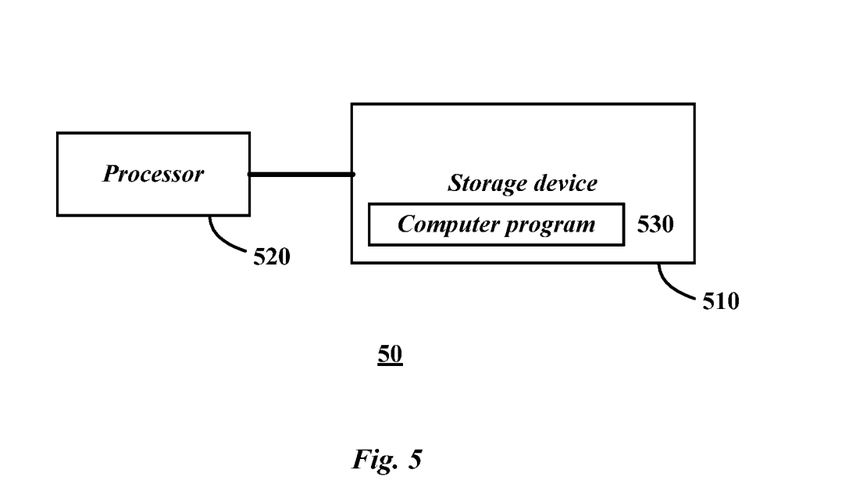
FIG. 5 is a block diagram illustrating an apparatus for performing protection control in a core network with separation between control plane and user plane according to another embodiment.

FIG. 5 is a block diagram illustrating an apparatus for performing protection control in a core network with separation between control plane and user plane according to another embodiment.

With reference to FIG. 5, the apparatus 50 comprises a storage device 510 and a processor 520 coupled to the storage device 510. The storage device 510 is configured to store a computer program 530 comprising computer instructions. The processor 520 is configured to execute the computer instructions to perform some or all of the method steps as shown in FIG. 4.

Figure 6:
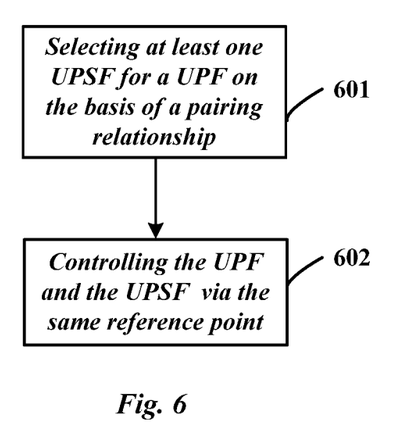
FIG. 6 schematically illustrates a flowchart of the method performing protection control in a core network according to another embodiment of the present invention.

A flowchart of a method 600 for performing protection control in a core network according to another embodiment of the present invention is shown in FIG. 6. The core network, with separation between control plane and user plane, comprises a UPF, one or more UPSFs and a CPF.

As shown in FIG. 6, the flowchart comprises the following steps performed at CP side:
  Step 601: selecting at least one UPSF for a UPF on the basis of a pairing relationship; and
  Step 602: controlling the UPF and the UPSF by a CPF, e.g., SMF or SCP, via the same reference point, e.g., N4.

In this embodiment, preferably, control plane receives the pairing relationship during a service registration procedure or a service update procedure associated with a NRF.

In this embodiment, preferably, the pairing relationship is obtained by the CPF, e.g., SMF, during a discovery procedure.

Figure 7:
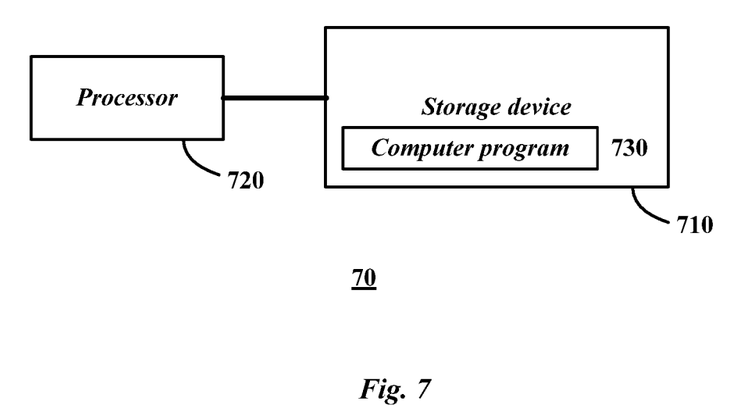
FIG. 7 is a block diagram illustrating an apparatus for performing protection control in a core network with separation between control plane and user plane according to another embodiment.

FIG. 7 is a block diagram illustrating an apparatus for performing protection control in a core network with separation between control plane and user plane according to another embodiment.

With reference to FIG. 7, the apparatus 70 comprises a storage device 710 and a processor 720 coupled to the storage device 710. The storage device 710 is configured to store a computer program 730 comprising computer instructions. The processor 720 is configured to execute the computer instructions to perform some or all of the method steps as shown in FIG. 5.

As described above, the pairing relationship may be included in a NfProfile transmitted to a Network Repository Function (NRF) during UPF service registration procedure or UPF service update procedure. In an illustrative example, this can be achieved by modifying a UPF service registration procedure as defined in 3GPP TS 23.502 4.17.1, which is incorporated herein by reference in its entirety.

Figure 8:
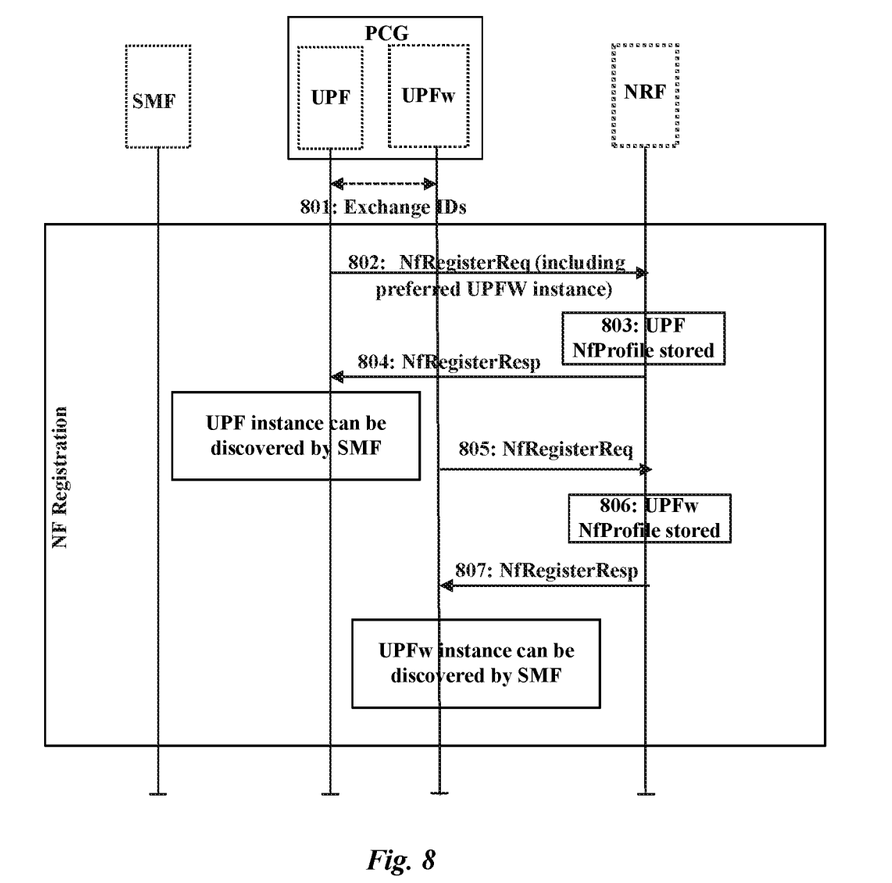
FIG. 8 schematically illustrates a modified UPF service registration procedure according to another embodiment of the present invention.

FIG. 8 schematically illustrates a modified UPF service registration procedure according to another embodiment of the present invention. In this embodiment, UPF and UPFw are included in, bound to, or part of the same PCG.

As shown in FIG. 8, the procedure comprises the following steps:
  Step 801: Within PCG instance, UPF and UPFw exchange their respective unique identities, e.g., UUID. Preferably, the identities are included in NfProfiles sent from UPF and UPFw to NRF, and thus SMF can identify UPF and UPFw instances belonging to the same PCG based on these identities.

Step 802: New UPF instance send NfProfile including UPF UUID. As part of the UpfInfo, the UUID for the preferred UPFw is also included in NfProfile.

Step 803: NRF stores the NfProfile identified by unique UPF NfInstanceID (UUID).

Step 804: NRF replies with successful NfRegisterResp.

Step 805: UPFw instance send NfProfile including UPFw UUID. As part of the UPFwInfo, the UUID for the preferred UPF is also included in NfProfile.

Step 806: NRF stores the NfProfile identified by the unique UPFw NfInstanceID (UUID).

Step 807: NRF Replies with successful NfRegisterResp.

Afterwards, UPF and UPFw can be discovered and selected by SMF for new session creation requests.

In this embodiment, UPF and UPFw register independently in NRF. Therefore, the procedure as shown in FIG. 8 are fully compatible with existing NRFs if NRFS accept new NF type, i.e., UPFw.

As described above, the NfProfiles of UPF and UPFw may include a pairing relationship between UPF and UPFw, which allows an optimized selection for UPF and UPFw. That is, with the pairing relationship, a CPF could select a preferred 'partner' for UPF instance or UPFw instance.

Figure 9:
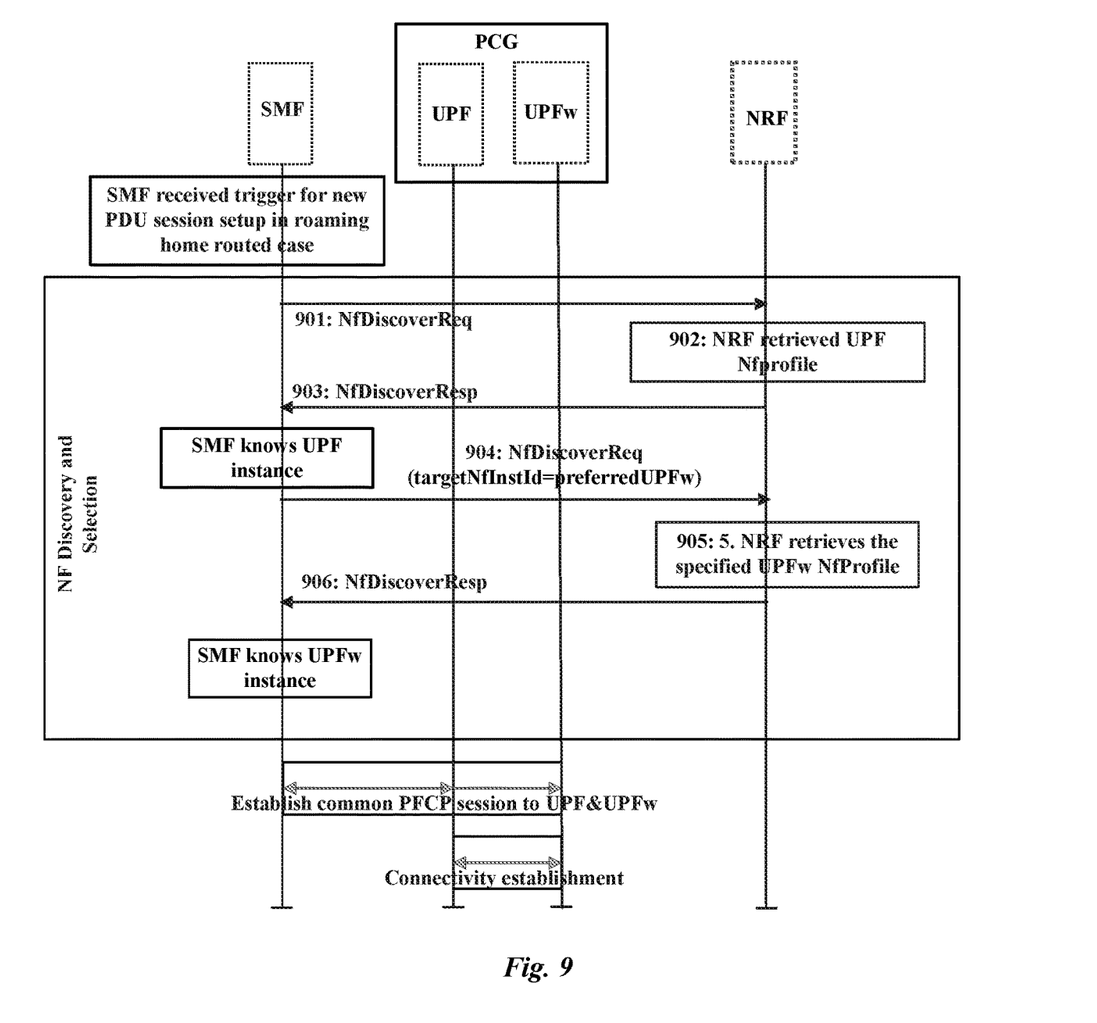
FIG. 9 schematically illustrates a discovery procedure according to another embodiment of the present invention.

As described above, the pairing relationship may be obtained by SMF during a discovery procedure. FIG. 9 schematically illustrates a discovery procedure according to another embodiment of the present invention. For illustrative purpose, in this embodiment, no cached UPF profiles data are available at SMF, and thus NRFs NfDiscovery service is used for finding suitable UPF.

As shown in FIG. 9, the procedure comprises the following steps:

Step 901: SMF sends NfDiscoverReq to NRF asking for UPFs matching the case (slice, PLMNm etc.).

Step 902: NRF queries the NRF repository for NfInstances matching the request.

Step 903: NRF returns the matching UPF instance profiles in NfDiscoverResp. Thus, SMF has all eligible UPF NfProfiles and can select the desired instance. In the NfProfile, the preferred UPFw instance is listed. Thus, SMF can optimize the instance selection.

Step 904: SMF starts discovery of UPFw with NfDiscoveryReq(targetNfInstance=UPFw–UUID). Alternatively, all UPFw Instances can be discovered and cached for later usage. The filtering with UUID can then be done on the local cache.

Step 905: NRF retrieves the specified UPFw NfProfile.

Step 906: NRF returns NfDiscoverResp with UPFw details to SMF.

Afterwards, SMF has profiles for UPF and UPFw, which include connectivity details and PFCP endpoint information. In this embodiment, PFCP session is established with PCG, i.e., the same session can be used for UPF and UPFw. This saves resources in SMF and avoids a need to send duplicated information from SMF. Moreover, connectivity between UPFw and UPF can be PCG internal and implementation specific.

Figure 10:
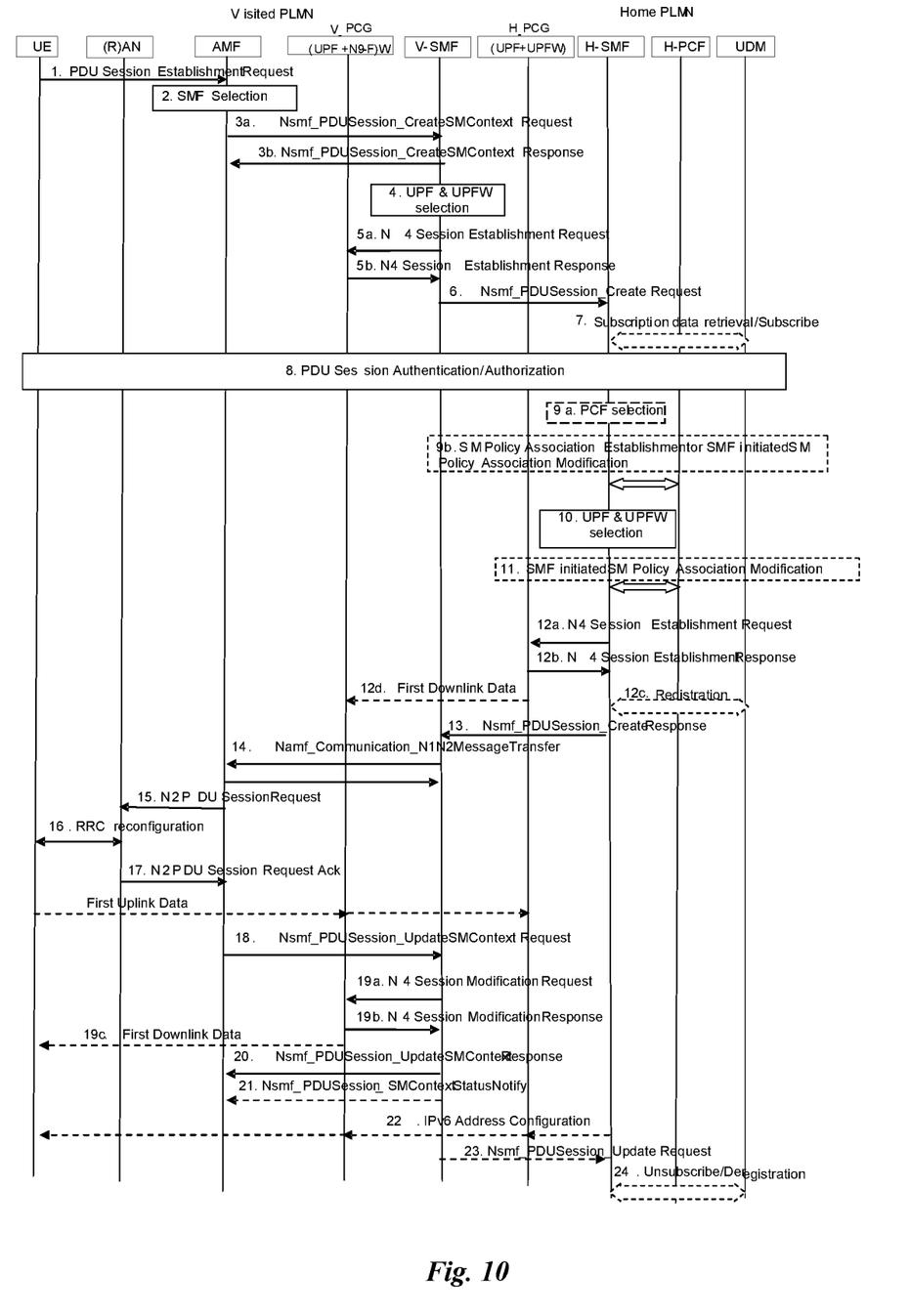
FIG. 10 schematically illustrates a UE initiated PDU session establishment procedure according to another embodiment of the present invention.

FIG. 10 schematically illustrates a UE initiated PDU session establishment procedure according to another embodiment of the present invention. The procedure as shown in FIG. 10 is a modified version of a UE-requested PDU Session Establishment for home-routed scenarios as defined in 3GPP TS 23.502 V15.3.0, which is incorporated herein by reference in its entirety. The following description will focus on the modified parts, which include:

Step 4: When the V-SMF selects a UPF for the PDU session, it selects a UPF with a PreferredUpfwInstance. If none of the UPFs that satisfy the other criteria of the establishment request, any other UPFw that can server the request is selected.

In either case the NfProfile of the UPF and UPFw include the connectivity information that is needed to establish N9 between UPF and UPFw.

Steps 5a-5b: V-SMF triggers N4 Session Establishment Request towards PCG. This session is used to control both, the UPF and the UPFw. Therefore, the request message contains an indicator that this session is intended for control of UPF and UPFw and the needed connectivity information to establish N9. Note that in some cases where the UPF and UPFw are in the same deployable Software (SW) entity, the connectivity information might not be needed as this is internal in the deployable unit.

Steps 10 and 12a-12b: The same modification as described above is applicable to the Home network. Note that it is possible to have the UP-FW only in either home or visited network. There is no interaction.

Step 12d: At that stage the home network has an established Control plane session and the TEIDs are successfully transferred to the H-UPFw. Thus, the UPFw allows uplink and downlink data to flow. However, since the V-UPFw has not received yet the confirmation of the successful CP session establishment, the downlink data will not pass the V-UPFw.

Step 19c: At this stage the final update with TEID of the H-UPF is sent to V-UPF and V-UPFw. This is indication for the UPFw that a successful CP session is established, and the downlink data flow is enabled.

It should be noted that the aforesaid embodiments are illustrative instead of restricting, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. Embodiments can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

What is claimed is:

1. A method for performing protection control in a core network with separation between control plane and user plane, comprising:
    pairing a User Plane Function (UPF) and at least one User Plane Security Function (UPSF); and
    notifying a pairing relationship between the UPF and the UPSF to the control plane so that the pair of the UPF and the UPSF can be controlled by a Control Plane Function (CPF) via the same reference point.

2. The method of claim 1, wherein the at least one UPSF is a User Plane Firewall (UPFw) or a user plane component of a Security Edge Protection Proxy (SEPP-UP), and the CPF is a Session Management Function (SMF) or a Service Communication Proxy (SCP).

3. The method of claim 1, wherein the at least one UPSF and the UPF are paired by including them into a Packet Core Gateway (PCG) or binding them to the PCG.

4. The method of claim 1, wherein the at least one UPSF and the UPF are paired by integrating the UPSF into the UPF.

5. The method of claim 4, wherein the notifying is performed during a service registration procedure or a service update procedure associated with a Network Repository Function (NRF).

6. The method of claim 5, wherein the notifying is performed by transmitting to the NRF a UPF profile from the UPF and a UPSF profile from the UPSF, the UPF profile from the UPF and the UPSF profile from the UPSF include IDs for the UPF and the UPSF.

7. An apparatus for performing protection control in a core network with separation between control plane and user plane, comprising:
a storage device configured to store a computer program comprising computer instructions; and
a processor coupled to the storage device and configured to execute the computer instructions to perform a method comprising:
pairing a User Plane Function (UPF) and at least one User Plane Security Function (UPSF); and
notifying a pairing relationship between the UPF and the UPSF to the control plane so that the pair of the UPF and the UPSF can be controlled by a Control Plane Function (CPF) via the same reference point.

8. A method for performing protection control in a core network with separation between control plane and user plane, comprising:
selecting at least one User Plane Security Function (UPSF) for a User Plane Function (UPF) on the basis of a pairing relationship; and
controlling the UPF and the UPSF by a Control Plane Function (CPF) via the same reference point.

9. The method of claim 8, wherein the at least one UPSF is a User Plane Firewall (UPFw) or a user plane component of a Security Edge Protection Proxy (SEPP-UP), and the CPF is a Session Management Function (SMF) or a Service Communication Proxy (SCP).

10. The method of claim 8, wherein the at least one UPSF and the UPF are paired by including them into a Packet Core Gateway (PCG) or binding them to the PCG.

11. The method of claim 8, wherein the at least one UPSF and the UPF are paired by integrating the UPSF into the UPF.

12. The method of claim 9, further comprising:
receiving the pairing relationship during a service registration procedure or a service update procedure associated with a Network Repository Function (NRF).

13. The method of claim 9, wherein the pairing relationship is obtained by the SMF during a discovery procedure.

14. An apparatus for performing protection control in a core network with separation between control plane and user plane, comprising:
a storage device configured to store a computer program comprising computer instructions; and
a processor coupled to the storage device and configured to execute the computer instructions to perform a method comprising:
selecting at least one User Plane Security Function (UPSF) for a User Plane Function (UPF) on the basis of a pairing relationship; and
controlling the UPF and the UPSF by a Control Plane Function (CPF) via the same reference point.

15. A core network (hPLMN, vPLMN) with separation between control plane and user plane, the core network comprising:
a User Plane Function (UPF);
one or more User Plane Security Functions (UPSFs); and
a Control Plane Function (CPF),
wherein the UPF and at least one of the UPSFs are paired and controlled by the CPF via the same reference point.

16. The core network of claim 15, wherein the at least one of the UPSFs is a User Plane Firewall (UPFw) or a user plane component of a Security Edge Protection Proxy (SEPP-UP), and the CPF is a Session Management Function (SMF) or a Service Communication Proxy (SCP).

17. The core network of claim 15, wherein the core network further comprises a Packet Core Gateway (PCG), and the at least one of the UPSF and the UPF are paired by including them into the PCG or binding them to the PCG.

18. The core network of claim 15, wherein the at least one of the UPSF and the UPF are paired by integrating the UPSF into the UPF.

19. The core network of claim 16, wherein the at least one of the UPSF and the UPF are configured to notify their pairing relationship to a Network Repository Function (NRF) during a service registration procedure or a service update procedure.

20. The core network of claim 19, wherein the at least one of the UPSF and the UPF are configured to notify the pairing relationship by transmitting to the NRF a UPF profile from the UPF and a UPSF profile from the UPSF, the UPF profile from the UPF and the UPSF profile from the UPSF include IDs for the UPF and the UPSF.

21. The core network of claim 19, wherein the SMF is configured to obtain the pairing relationship during a discovery procedure.

22. The core network of claim 19, wherein the SMF is configured to selects a UPSF for the UPF on the basis of the pairing relationship during a Protocol Data Unit (PDU) session establishment procedure.

23. A computer program product for performing protection control in a core network with separation between control plane and user plane, the computer program product being embodied in a non-transitory computer readable storage medium and comprising computer instructions for performing the method of claim 1.

24. A computer program product for performing protection control in a core network with separation between control plane and user plane, the computer program product being embodied in a non-transitory computer readable storage medium and comprising computer instructions for performing the method of claim 8.

* * * * *

UNITED STATES PATENT AND TRADEMARK OFFICE
CERTIFICATE OF CORRECTION

PATENT NO. : 12,108,245 B2  
APPLICATION NO. : 17/636772  
DATED : October 1, 2024  
INVENTOR(S) : Turina et al.

Page 1 of 2

It is certified that error appears in the above-identified patent and that said Letters Patent is hereby corrected as shown below:

On the Title Page

In Column 1, below item (65), insert item -- (30) Foreign Application Priority Data PCT/CN2019/101387 (CN) ................ Aug. 19, 2019 --.

In the Drawings

In Fig. 2, Sheet 1 of 7, delete "N4'" and insert -- N4 --, therefor.

In Fig. 2, Sheet 1 of 7, delete "N4'" and insert -- N4 --, therefor.

In Fig. 3, Sheet 2 of 7, delete "N4'" and insert -- N4 --, therefor.

In Fig. 10, Sheet 7 of 7, delete "V isited PLMN" and insert -- Visited PLMN --, therefor.

In Fig. 10, Sheet 7 of 7, delete "N 4" and insert -- N4 --, therefor.

In Fig. 10, Sheet 7 of 7, delete "Ses sion" and insert -- Session --, therefor.

In Fig. 10, Sheet 7 of 7, delete "N 4" and insert -- N4 --, therefor.

In Fig. 10, Sheet 7 of 7, delete "Redistration" and insert -- Registration --, therefor.

In Fig. 10, Sheet 7 of 7, delete "N2P DU" and insert -- N2 PDU --, therefor.

In Fig. 10, Sheet 7 of 7, delete "N2PDU" and insert -- N2 PDU --, therefor.

In Fig. 10, Sheet 7 of 7, delete "N 4" and insert -- N4 --, therefor.

In Fig. 10, Sheet 7 of 7, delete "N 4" and insert -- N4 --, therefor.

Signed and Sealed this  
First Day of April, 2025

Coke Morgan Stewart  
*Acting Director of the United States Patent and Trademark Office*

CERTIFICATE OF CORRECTION (continued)
U.S. Pat. No. 12,108,245 B2

In the Specification

In Column 2, Line 43, delete "selects" and insert -- select --, therefor.

In Column 3, Line 9, delete "vPLMN" and insert -- vPLMN. --, therefor.

In Columns 5 & 6, in Table, Line 4, delete "S-NSSAI" and insert -- S-NSSAI. --, therefor.

In Column 6, Line 12, delete "hPLMN)" and insert -- hPLMN --, therefor.

In Column 6, Line 16, delete "particular" and insert -- particularly --, therefor.

In Column 9, Line 34, delete "PLMNm" and insert -- PLMN --, therefor.

In Column 10, Line 2, delete "server" and insert -- serve --, therefor.

In the Claims

In Column 12, Line 43, in Claim 22, delete "selects" and insert -- select --, therefor.